United States Patent [19]
Dumbeck

[11] Patent Number: 4,567,939
[45] Date of Patent: Feb. 4, 1986

[54] COMPUTER CONTROLLED AIR CONDITIONING SYSTEMS

[76] Inventor: Robert F. Dumbeck, P.O. Box 548, Elgin, Tex. 78621

[21] Appl. No.: 657,677

[22] Filed: Oct. 4, 1984

Related U.S. Application Data

[63] Continuation-in-part of Ser. No. 576,431, Feb. 2, 1984.

[51] Int. Cl.$^4$ .................. F25B 29/00; F24F 13/04
[52] U.S. Cl. ........................ 165/16; 62/260; 52/169.6; 165/45; 236/13
[58] Field of Search .............. 165/16, 45; 98/38 R; 236/13; 62/260; 52/169.6

[56] References Cited

U.S. PATENT DOCUMENTS

| | | | |
|---|---|---|---|
| 2,210,960 | 8/1940 | St. Pierre | 98/31 |
| 3,326,464 | 6/1967 | Rose, Jr. | 165/21 |
| 3,353,191 | 11/1967 | Dahly | 62/235.1 X |
| 3,547,348 | 12/1970 | Kruper | 236/44 |
| 3,758,029 | 9/1973 | Yoshida | 98/39 |
| 3,758,368 | 9/1973 | Trask | 165/21 |
| 4,037,783 | 7/1977 | Bradford | 236/49 |
| 4,164,172 | 8/1979 | Anderten et al. | 165/16 X |
| 4,205,381 | 5/1980 | Games et al. | 165/16 X |
| 4,227,645 | 10/1980 | de La Farge et al. | 236/49 |
| 4,463,801 | 8/1984 | Yoshimi et al. | 165/16 X |
| 4,478,049 | 10/1984 | Fukui et al. | 165/16 X |

Primary Examiner—William E. Tapolcai
Attorney, Agent, or Firm—Laurence R. Brown

[57] ABSTRACT

A general purpose programmed computer controls an air circulation type air conditioning system as the operating equipment between temperature, humidity and oxygen sensors and control devices for modifying temperature, humidity and oxygen content of the circulating air. The various control algorithms are programmed into the computer as well as the control sequence for sampling the sensors and making corresponding corrections and a complex interrelationship of variables controllable for optimum energy expenditure. In particular for tightly closed houses, the oxygen content is controlled by admission of fresh atmospheric air. Particularly for houses, such as underground houses, with substantial concrete wall surfaces in thermal contact with the earth to moderate temperature, dehumidification control is critical even for summer hookups. In such houses, the energy expenditure of this system is low enough to operate substantially wholly on solar energy by way of a battery operated D-C motor driving a circulating fan and heat pump with the battery rechargeable by solar energy.

6 Claims, 5 Drawing Figures

COMPUTER CONTROLLED AIR CONDITIONING SYSTEMS

BACKGROUND ART

This is a continuation-in-part of my copending application U.S. Ser. No. 576,431 filed Feb. 2, 1984 for Control of Temperature of Humidity in Concrete Building Walls, which is incorporated in entirety herein by reference.

TECHNICAL FIELD

This invention relates to computer controlled air conditioning systems and more particularly it relates to such circulating air types of air conditioning systems which mix fresh atmospheric air into the air circulation flow path.

For many years now tightly closed houses have been customary to prevent energy losses. It has not been uncommon in such houses to have suffocations because of low oxygen levels when the houses are closed for long time periods without entry of fresh atmospheric air. Accordingly, attention need be given to the need for oxygen and fresh air in a manner consistent with efficient use of energy.

Advanced trends toward energy efficiency provide housing with underground walls having concrete walls in thermal contact between the earth and the house interior circulating air temperature maintenance systems to maintain a moderate year around temperature. However, in these houses humidity presents a serious problem both in dry and damp conditions. Sweating caused when humidity becomes too high can cause mildew and damage to property and clothes. Also, it is uncomfortable for house occupants. Alternatively, when humidity is too low, the concrete walls become damaged and lose strength and the bond between the outside surface of the walls and earth may part or crack and cause leakage problems after rains. Humidity control thus becomes critical.

Modern technology has supplied automatic air conditioning for houses to keep temperatures and humidity in a personally selected comfort range. For example, A. C. Rose, Jr. in U.S. Pat. No. 3,326,464—June 20, 1967 provides an air circulation air conditioning control system that responds to low humidity by humidifying the circulating air. This system also provides control of fresh air intake into the circulating system for the purpose of reducing humidity. Similarly, A. P. Kruper, U.S. Pat. No. 3,547,348—Dec. 15, 1970 provides separate computers for automatic humidifying and dehumidifying control of circulating air.

Both oxygen and negative ions are supplied during operation of an air conditioner unit by T. Yoshida in U.S. Pat. No. 3,758,029—Sept. 11, 1973 to counteract air pollution and consumption by occupants. The bottled oxygen source is cut off in the case of fire. Thus, the need for controls compensating for air consumption and pollution by an air conditioning system is known.

Thermostatic control of an air flow path admitting atmospheric air for ventilation purposes in response to automatically controlled air mixing valve structure is provided by A. Trask in U.S. Pat. No. 3,758,368—Sept. 11, 1973. Humidification and dehumidification are also automatically controlled. Energy efficiency improvement is attained by use of outdoor air as a cooling source when the outdoor temperature is proper.

G. J. Bradford, U.S. Pat. No. 4,037,783—July 26, 1977 provides an air mixing valve system responsive to outside air temperature for keeping constant the volume of fresh air mixed into the circulating air of a temperature control system, applicable when Government standards require a fixed percentage of fresh atmospheric air mixed with circulating air of an air conditioning system for the purpose of maintaining an adequate oxygen level within a dwelling.

Computerization of the various desired air conditioning functions is illustrated by B. de La Farge, U.S. Pat. No. 4,227,645—Oct. 14, 1980, wherein various algorithms control computer operation to produce a control condition based upon the personal temperature, weight, etc. of occupants of the enclosure being air conditioned from selection of heating and ventilator options under summer or winter options.

In the prior art, however, there are significant deficiencies in achievement of a comprehensive system that balances the needs for automatic temperature, humidity and fresh air control meeting personal comfort and safety conditions with the operating efficiency of energy expended. More specific deficiencies include the problem of safety from oxygen deficiency in tightly sealed housing units. For example, conventional air conditioning systems concerned with operating energy efficiency in winter hookups avoid the entry of cold atmospheric air, and use fresh air entry when outside to inside temperature differentials show that the air temperature will move the temperature toward a predetermined desired operating range. That mode of operation, as aforesaid, can lead to suffocation from deficiency of oxygen, particularly with fossil fueled furnaces which consume oxygen in heating being heavily used in cold winter conditions.

Additionally, although automatic humidity controls are well known, the conventional modes of control basically are for summer-winter hookups to dehumidify in the warm summer days and to humidify in cool winter days when heaters are on. There have not been humidity controls that satisfactorily operating in a mode or capacity to maintain humidity in a comfort range throughout all encountered conditions in housing with a large percentage of concrete walls in thermal contact with the earth and thus affording high humidity and sweating inside the housing enclosure, where humidity control is critical not only to comfort but also to preservation of the concrete walls.

There is a deficiency of prior art systems providing for air conditioning system corrective response to the presence of stale or foul air within the air conditioned enclosure.

The computerized air conditioning systems of the prior art are inefficient and cumbersome and are not easily adaptable to the interfacing with the sensor-controllers such as thermostats or humidistats and the various controlled elements such as fans, heaters, coolers, humidifiers, etc. nor are they comprehensive in nature for achieving complex control features in an efficient manner to synergetically reducing control hardware.

All prior art systems are such that great amounts of energy are necessary. It is not known in the prior art how to achieve a comprehensive automatic air conditioning system with substantially no operational energy cost.

It is therefore a general objective of this invention to correct the aforesaid deficiencies of the prior art by providing an improved computer controlled air conditioning system. Further objects, features and advantages of the invention will be found throughout the description, drawing and claims.

DISCLOSURE OF THE INVENTION

A simple, inexpensive, comprehensive automatic computer controlled air conditioning system processes circulation of air through an enclosure such as a house to establish desired ranges of temperature, humidity and oxygen. A programmable micro-processor responds to the basic sensed air quality parameters (temperature, humidity, $O_2$) with suitable algorithms to produce basic control signals for actuating air modification hardware (humidity control means, heating means and fresh air inlet means). The computer thus serves to optomize control ranges for each parameter, to observe and make decisions in the presence of interacting factors affecting occupant comfort and safety (such as temperature and humidity or oxygen level and temperature), to provide overall efficiency of operation and to establish a comprehensive sampling control procedure.

The basic control mode circulates air at a predetermined flow rate continuously through a flow path in which the desired air parameters are modified by control of appropriate heating, cooling and venting equipment. The system efficiency is such that for a housing unit with underground concrete walls in thermal contact with the earth to establish a year round moderate enclosure temperature, substantially no energy need be purchased for normal chronic operational conditions. This is achieved by efficiency such that a small battery operated DC motor can drive the system with the battery being recharged from solar energy.

BRIEF DESCRIPTION OF THE DRAWINGS

Throughout the various figures of the drawing, like reference characters are used to indicate similar features thereby to facilitate comparison. In the drawings.

THE PREFERRED EMBODIMENT

Figure 1:
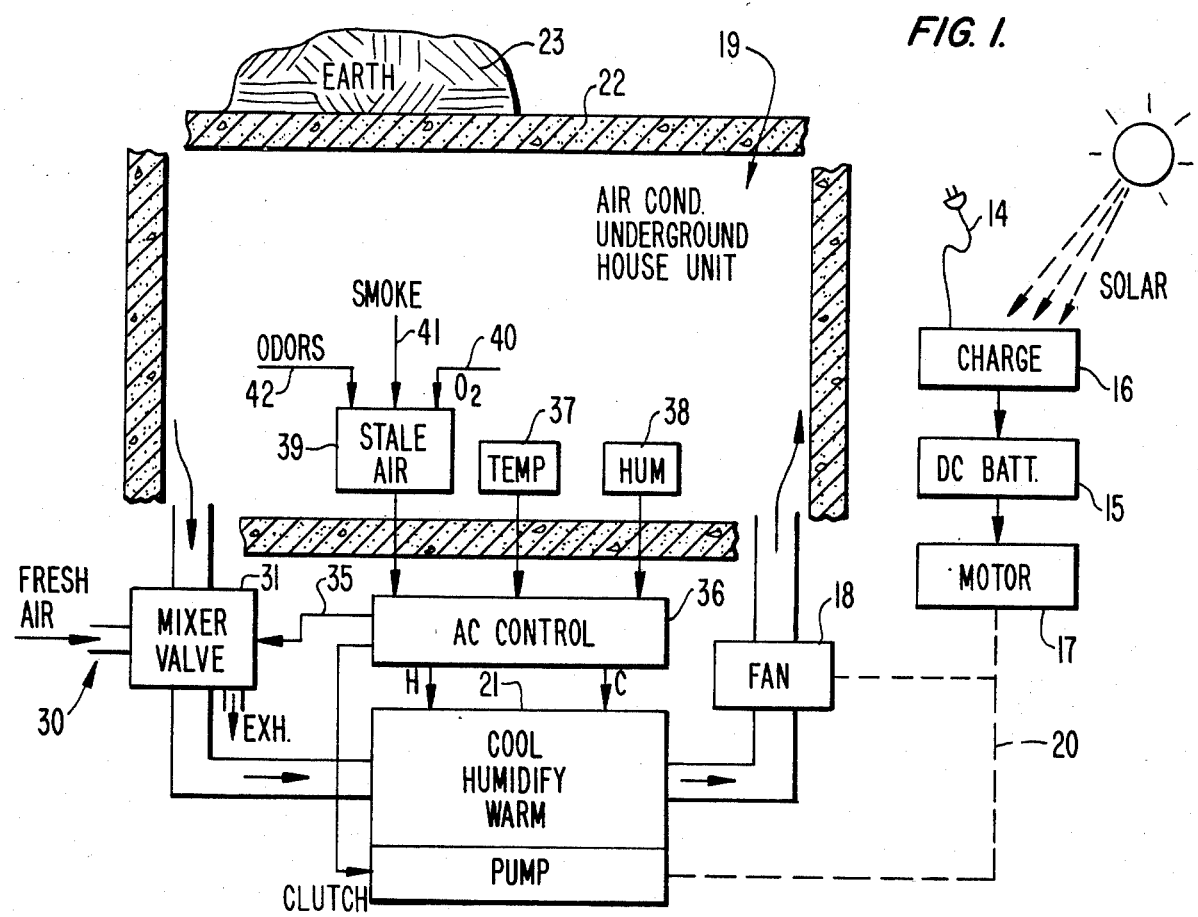
FIG. 1 is a block diagram of a preferred embodiment of an energy efficient comprehensive air conditioning system embodying the invention.

The present invention has among its objectives, very low energy cost and simplified low cost installation of a comprehensive air conditioning system for controlling temperature, humidity and oxygen content of the interior house climate. Thus, FIG. 1 illustrates the basic system meeting these objectives.

For example, it may be seen that the system is operated from a battery 15 charged by solar energy with power line charging through charger unit 16 only needed for unusual peak usage conditions. No other such power efficient comprehensive air conditioning system for full winter-summer heating and cooling is known in the art. No other such comprehensive system has the capacity to operate in the presence of extended time power outages, for example, and still control critical oxygen levels within a dwelling. As a reference to this feature, operation is based upon one DC motor 17 circulating about 350 cubic feet per minute of air by means of continuously operating fan 18 to an 800 sq. foot duplex house interior 19, resulting in a complete air exchange every eighteen minutes. The motor drive system 20 also operates the compressorless heat exchange unit 21 for cooling, heating and dehumidifying to contribute to the low energy expenditure.

Also contributing to low energy expenditure is the housing construction, namely concrete walls 22 in thermal contact with the earth 23 to establish moderate wall temperatures year around. These walls are in thermal contact with the circulating air as a heat pump exchange surface which thus constitutes an important interacting element of an efficient air conditioning system by supplying cooling temperature in summer and heating temperatures in winter.

However, this particular housing construction feature contributes a critical factor not present in conventional air conditioning systems, namely critical dependency upon a controlled humidity level. Thus, in higher humidity summer conditions the cooler concrete walls will tend to sweat and thus encourage mold, mildew, etc. if not controlled. One factor in control is the limitation of circulation of outside high moisture bearing air 30 admitted by valve 31 into the circulation flow path under control means 35 operated by an air conditioner central decision control system 36 in response to sensed inputs from thermostat 37, humidistat 38 and stale air detector 39 located inside house 19. Another is the dehumidification capacity of the air cool-humidify-warm unit 21 which is controlled to keep the humidity of the circulating air inside the house 19 at a predetermined optimum level.

During winter or draught conditions the humidity conversely may become too low, and thus the system also provides for humidification of the circulating air. This is important also to preserve the concrete walls 22 which may not absorb enough moisture from the earth to prevent enough dryness that the concrete strength deteriorates and the walls erode.

As before discussed, adequate oxygen level in a tightly closed housing unit, such as this, is critical for human health. Thus, the stale air detector 39 senses oxygen 40 and serves to control the oxygen level inside the house 19. Also, smoke from fire, cooking, etc. can be sensed at 41 and other undesirable odors such as cooking odors, onions, etc. can be sensed at 42 all for control of fresh air input at mixer valve 31 in accordance with a priority schedule established by the control center 36. Preferably the control center 36 is comprehensive enough to determine emergency conditions for immediate action, slowly changing conditions for continuous control and to administer priorities for effecting efficiency of energy expenditure in the system.

Also energy efficiency is attained in the system interaction because the various control decision functions are made with energy efficient devices such as an electronic computer central decision control device 36 and few mechanical controls such as simply air vent mixer valve 31 and a clutch or other heat or cool activating control 45, which are momentarily actuated from time to time as programmed by the decision control portion 36.

Thus, it may be seen that it is for the first time possible to operate a fully comprehensive air conditioning system from a solar charged electric battery 15 with little need to draw extra energy from the power line 14, except for peak periods or unusual atmospheric conditions limiting available solar energy.

Figure 2:
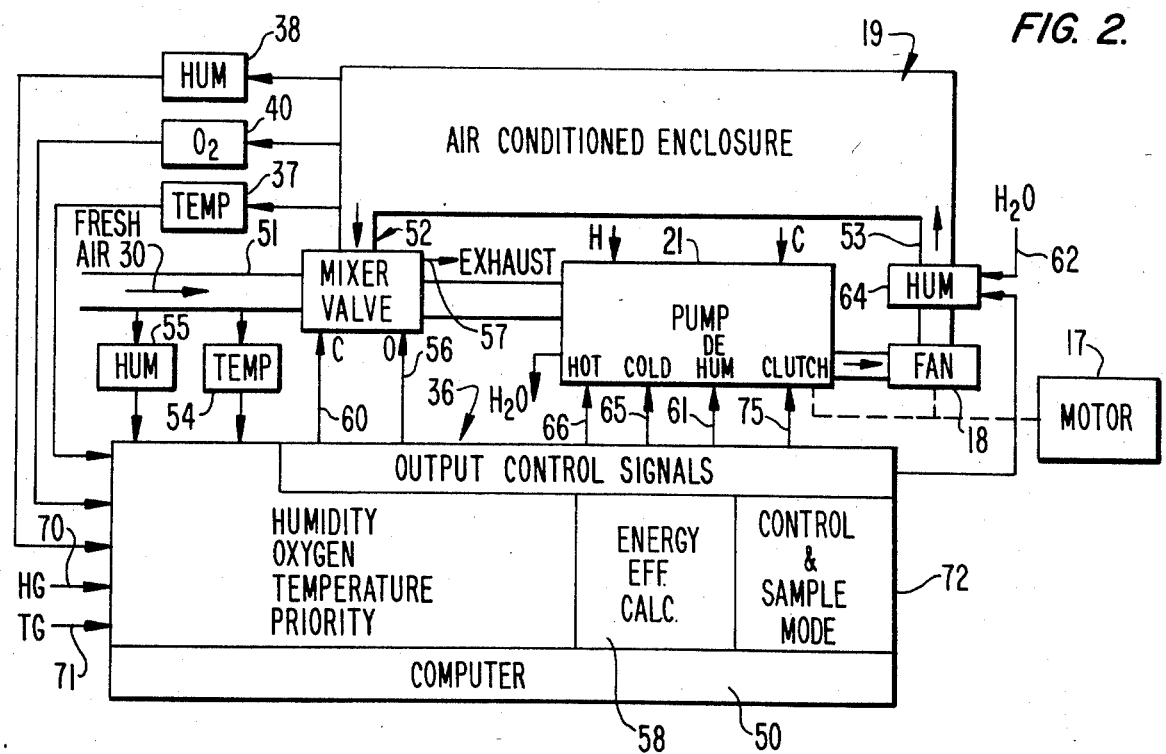
FIG. 2 is a further block diagram embodiment of the invention.

The decision control system as afforded by this invention comprises simply an electronic computer responsive to input temperature, humidity and air quality sensors to control a few basic output controls such as humidity, fresh air and temperature controls, which is operationally shown in block diagram form in FIG. 2. Thus, a single standard low cost general purpose programmable computer 50 serves to make operational decisions for a large variety of installations of different thermal capacities, control features and operational complexity levels simply, rapidly and with a minimum of operational equipment and cost. It is particularly advantageous in providing a packaged unit with very simple operational installation. Thus, essentially the entire system can consist solely of a single standard unit connected to a thermal energy source, such as a well, by two circulation ducts, dwelling input and output air circulation ducts and a fresh air inlet duct, as will be made evident hereinafter. Also, it is most advantageous that the hardware is considerably reduced by the capacity of the computer to make decisions based on any desired set of algorithms and to comprehensively provide operational sequencing, energy efficiency decisions, etc.

In this operational system, all elements may be contained in a single compact unit for communication with house 19 by way of connections only to inlet duct 53 and outlet duct 52, the fresh air duct 51, and to heat pump circulation ducts H, C. Thus, detectors of in house humidity (38), oxygen (40) and temperature (37), shown for clarity as associated with the house or other air conditioned enclosure 19, may in reality be in the return duct channel 52 wherein air is continually circulating. Similarly outdoor temperature and humidity detectors 54, 55 may be installed in fresh air duct 51 if there be an operation mode with a continuous stream of fresh air flowing into the circulated air which can flow past these detectors. Clearly the installation cost of this system is minimal.

The outside sensors of temperature 54 and humidity 55 provide information from which the computer 50 can calculate the most efficient form of mixing in fresh air if smoke should appear, for example, on a non-emergency mode. In the emergency mode, excluding fire, the computer could decide to open the fresh air valve 31 completely by control 56, thus overriding a conventional program to survey outside temperature and humidity to determine an energy efficient rate of replacement of stale air by exhaust through vent 57. This is designated in the computer complex by the energy efficiency calculation block 58. In control of the oxygen level, except in case of open flame fires in a fireplace, or some other rapid drain or available oxygen, the oxygen level inside the house is servo controlled to an optimum level consistent with normal usage by fresh air valves 56, 60.

Likewise, humidity calculations effect control of the dehumidification, effected generally in the cooler portion of the heat-cool unit 21 at control bus 61 to discharge water as schematically shown. Alternatively for humidification the computer can open water inlet 62 (a further installation connection when used) by control lead 63 to absorb water in the air processed by the heat pump, as shown in house inlet duct 53. Thus, humidifier 64 may simply be a water spray valve or some other known form of humidifier.

The computer 50 likewise controls heat and cooling as effected at controls 65, 66 of heat-cool unit 21. The power of the computer to replace hardware may be illustrated for example by automatic changeover from summer to winter hookup without manual switches, etc., as ascertained by calculations from outside temperature.

Manual selection of predetermined in-house humidity and temperature goals may be entered into the computer for establishing comfort levels as shown at 46, $T_G$ leads 70, 71 if desired. Various priorities may be determined by the computer calculations. For example, should oxygen somehow fall below a desirable threshhold, fresh air may be given priority over heat even if cold outside air is being entered.

The computer program provides the operation sequencing and sampling, etc. as suggested at block 72. Thus, the whole world of memory, past performance, comparative results that can be made available by computer technology leads to entirely new dimensions of control and automation for special purpose installations such as in industrial poultry farms, etc. Also, the computer can control the heat-cool unit by means of a drive clutch to a pump for circulating well water for example as indicated at 75.

Figure 3:
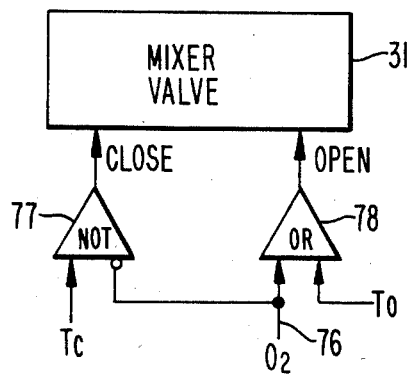
FIG. 3 is a fragmental block circuit diagram view illustrating an alternative fresh air venting control mode.

Priority decisions can be made by simple hardware if desired, or by alternatives to programmable computer algorithms, such as exemplified in FIG. 3 for the fresh air mixer valve 31. The line 76 is indicative of a signal line for a low oxygen condition. It is important that this override any other programmed conditions for preventing the input of fresh air where the $T_0$ signal indicates closure of the mixing valve. For example, if the winter outside air is cold and more inside heat is required, then the $O_2$ signal at 76 in HOT device 77 prevents closure and rather opens the valve by operation at OR device 78 to assure bringing oxygen up to a safe level.

A following set of simple algorithms illustrate the power of the programmable computer 50 to make decisions. The notation sub G is for manual or computer determined goals. Sub i is for inside the house sensor readings. Sub O is for outside ambient atmospheric sensor readings. Control algorithms are not shown because every computer program is in essence a control algorithm. However, the computer presents a wide range of possibilities of selection of sequencing of various decisions, branching and selection sub routines for determining operating efficiency before each decision, etc.

Humidity Control Algorithm

If $H_G > H_i$ then—activate humidifier
If $H_G < H_i$ then—activate dehumidifier Oxygen Control Algorithm If $O_2 < 20.5$ then mix in fresh air Temperature Control Algorithm If $T_G > T_i$ then activate cooler if $T_i < T_o$ but mix fresh air if $T_i > T_o$
If $T_G < T_i$ then activate heater Priority Algorithm If $O_2 < 20.5$ mix in fresh air and override all signals for closing fresh air vent.
If $O_2 > 20.5$ and $H_G < H_i$ then activate dehumidifier.
If $O_2 > 20.5$ and $H_G \approx H_i$ then activate temperature control algorithm.

Energy Efficiency Algorithm

If $T_0 > T_i$ and heater activation signal is present, branch to open fresh air vent.

If $T_0 < T_i$ and cooler activation signal is present, branch to open fresh air vent.

All parts of the system are well known in the art and are conventionally operated. Various oxygen and air quality sensing instruments are available, such as the digitized gas monitors available from Neotronics N.S., Inc. of Gainesville, Ga.

Figure 4:
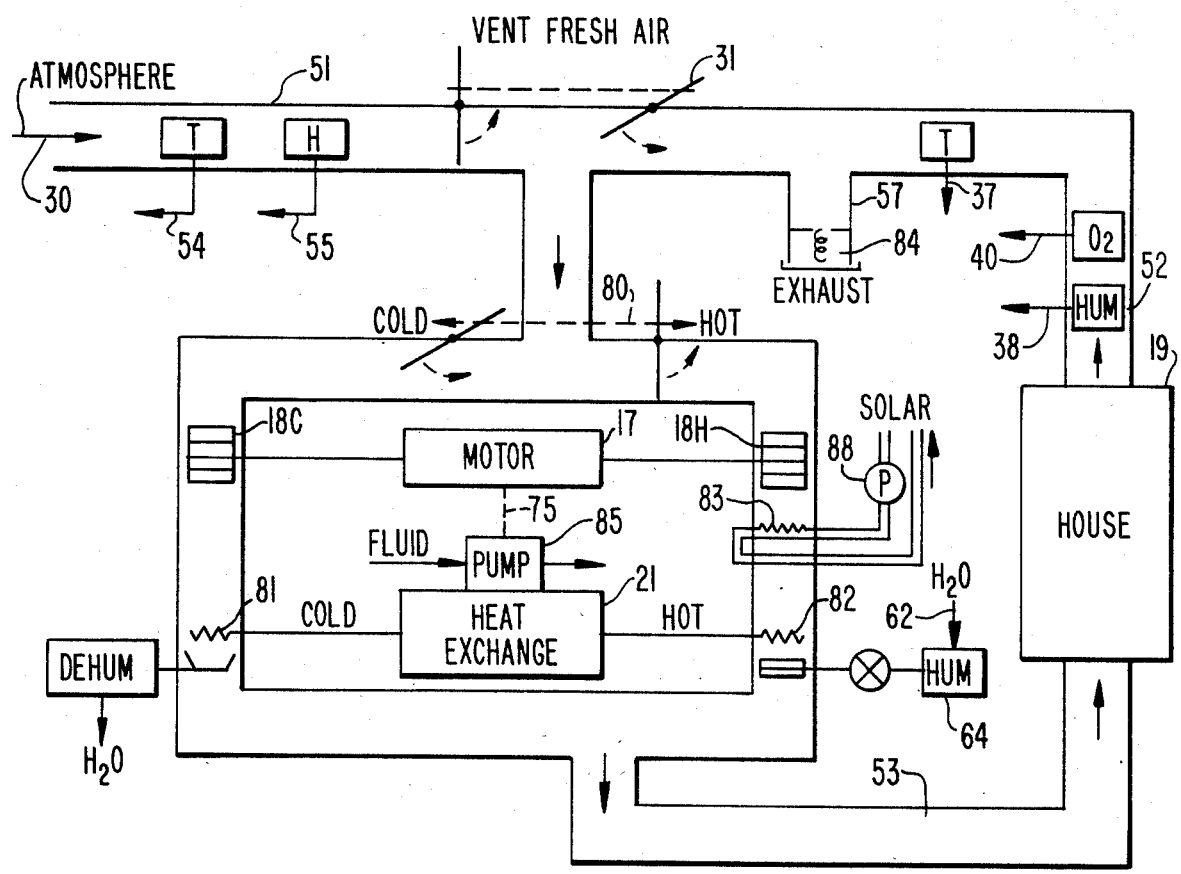
FIG. 4 is a system air flow path diagram.

A simplified air circulation control unit is set forth in FIG. 4 incorporating the synergistic features of fan and heat exchange control from a low energy battery operated motor and circulating air system control features. The motor 17 drives rotary fans 18C for cool air circulation and 18H for hot air circulation, depending upon the setting of the hot-cold flow control valve 80. Thus, circulated air flow either past heat exchange cool radiator 81 or warm radiator 82, as supplemented in some systems by the solar system radiator 83. On-off control may be effected by way of valve or pump 88. Exhaust air flows out pressure valve 84 when the fresh air mixer valve 31 restricts recirculation flow enough to operate the valve 84 and concurrently opens the fresh air duct 51. Thus, a compact unit driven by motor 17 results, with a drive connection to heat exchange 21 circulation pump 85, via control clutch 75 indicated by a dotted line that designates the need to circulate fluid. The cross referenced features demonstrate the self-contained unit advantages of this invention and the system ducting and installation advantages.

Figure 5:
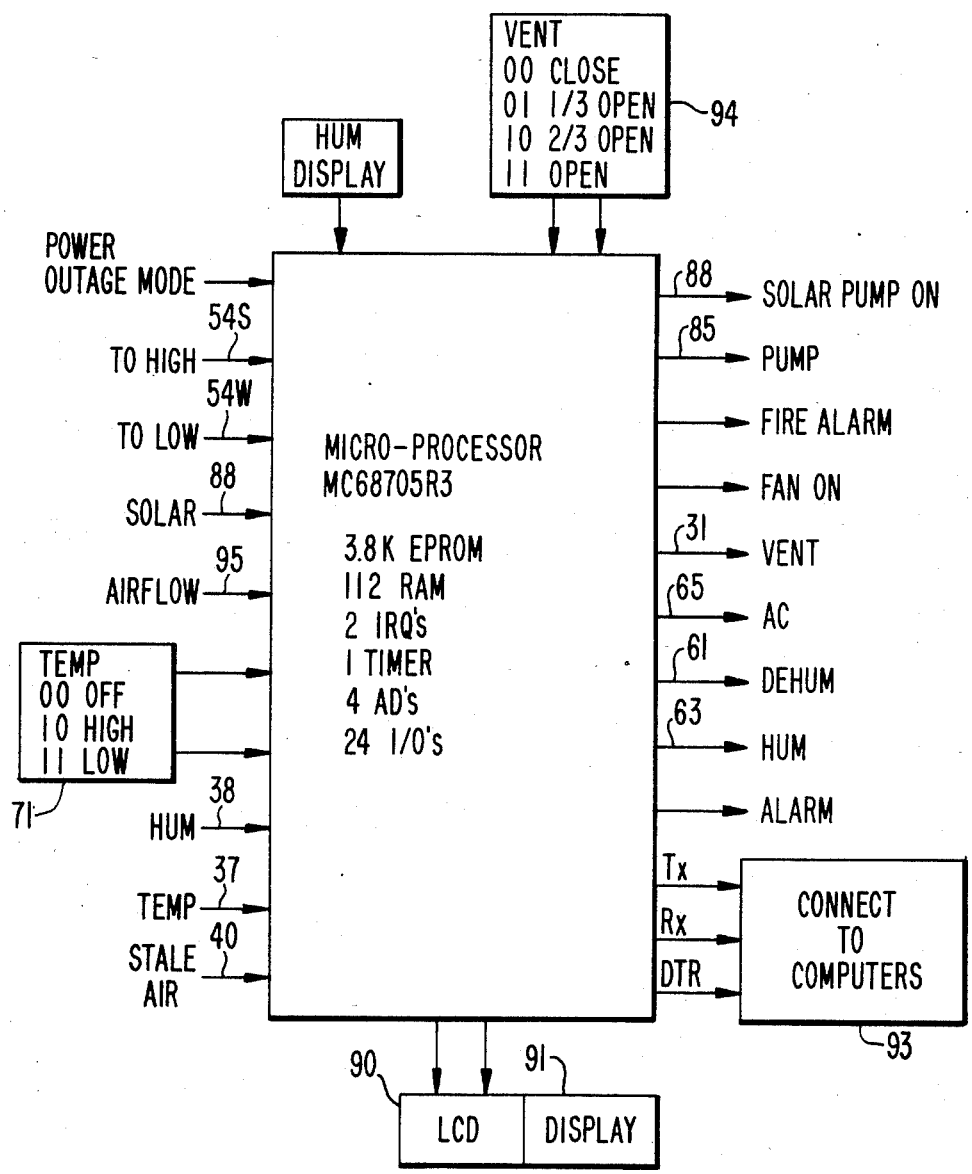
FIG. 5 is a computer system diagram.

A rich selection of micro-processors is now available for commercial programmable computers. Any such computer such as Motorola MC68705R3 can be simply connected for air conditioning systems of varying features and complexity as indicated by the block diagram of FIG. 5. Cross reference numerals carry forward the hereinbefore described control functions. Other manual and supplementary controls may be provided, as well as displays 90, 91, display activators 92 and connections to maintain computer terminals 93. A normal vent control position may be manually designated at 94, for example. Also, winter or summer operation 54W or 54S may be manually selected. Systems control for the air circulation motor 95, etc. may also be provided. The program control algorithms and system capabilities are a function of the programs selected for computer 50.

It is evident from the foregoing that this invention has advanced the state of the art by novel and unexpected features. Thus, those features of novelty believed descriptive of the spirit and nature of the invention are defined with particularity in the appended claims.

I claim:

1. In a computer controlled air conditioning system providing for circulation of air through an air conditioned house in contact with concrete walls requiring a humidity within a critical range, the improvement comprising in combination,
   a computer for processing sensed environmental input data including humidity and oxygen to produce output control signals for affecting the humidity of the air in said house,
   means for providing an air flow circulation path through said house in contact with said concrete walls,
   sensing means responsive to the amount of oxygen in the house for providing input signals to said computer,
   mixing means for combining with the air in said house a variable amount of fresh atmospheric air to supply fresh oxygen thereto, and
   humidity modifying means for modifying the humidity of the air flowing in said flow path responsive to said control signals,
   means in said computer operating as a function of said sensed data to control said humidity modifying means to establish a humidity in the house within said critical ranges and further for producing in response to a predetermined algorithm one of said output control signals for control of the mixing means to establish an oxygen content in said house within a predetermined critical range healthy to human occupants.

2. An air conditioning system as defined in claim 1 further including in combination,
   means for sensing the temperatures of both the air within said house and the atmospheric air being provided by said mixing means,
   means in said computer for providing an output control signal for maintaining a predetermined temperature range within said enclosure, and
   means for modifying the temperature within said house in response to the computer output control signal for maintaining said predetermined temperature thereby to attain said predetermined temperature comprising means for variably controlling the amount of fresh air supplied by said mixing means.

3. An air conditioning system as defined in claim 2 further comprising:
   means for providing for control of the amount of fresh air supplied in response to a control signal processed by said computer from an algorithm providing for processing the two said temperatures sensed to produce a mixing ratio of atmospheric air to circulating air that effects energy conservation.

4. The air conditioning system defined in claim 1 further comprising,
   thermostat means for sensing the temperature within said house and providing an output temperature signal,
   temperature control means for controlling the temperature within said house within a predetermined range,
   means in said computer for producing in response to the temperature signal and a predetermined algorithm a temperature control signal coupled to the temperature control means to control the temperature within said house.

5. The air conditioning system defined in claim 4 further comprising,
   computer control means for establishing priorities for effecting the computer controls in the order of first establishing the oxygen level, secondly establishing the humidity level and then estalishing the temperature level.

6. An air conditioning system controlling safety and comfort of occupants of underground housing units by control of input flow of fresh air for attaining a year round stable predetermined temperature, humidity and oxygen content condition of air present in a housing unit enclosure which is comfortable for human occupants, comprising in combination, a housing unit having substantial concrete wall surfaces in contact with the earth below the surface of enough area to maintain the temperature within the housing enclosure at a moderate temperature year round because of conduction and radiation from concrete walls in thermal contact with the earth, air circulation means for circulating air from a housing unit through a flow path in contact with said walls including means for changing at least one parameter of the air for improving the comfort and safety of occupants of the housing unit comprising fresh air control means including a mixing valve controllable in response to control signals for introducing fresh atmospheric air into the flow path, stale air detection means for determining the condition of the air in the housing unit and providing a fresh air entry control signal when the condition of the air falls below a predetermined quality threshold coupled for controlling the entry of fresh air by the fresh air control means, a continuously running fan for circulating the air through the housing unit driven by a DC motor from a battery power supply, and charging means for said battery selectively operable from either a power line or solar energy, humidity control means, a pump cooled for driving by said motor to modify the air temperature by circulating a temperature modifying fluid upon demand for a change of air temperature thereby, and a control system for sensing the air temperature, oxygen content and humidity and therefrom deriving control demand signals for control of the pump, fresh air entry and humidity control means to effect specific changes of air, temperature and humidity.

* * * * *